UNITED STATES PATENT OFFICE 2,481,584

SEPARATION OF COLUMBIUM AND TANTALUM

Robert M. Fowler, Niagara Falls, N. Y., assignor, by mesne assignments, to Union Carbide and Carbon Corporation, a corporation of New York No Drawing. Application February 21, 1946, Serial No. 649,397

3 Claims. (Cl. 23—19)

The invention relates to the treatment of ores containing columbium and tantalum, and more particularly to the separation and recovery of columbium and tantalum compounds from such ores.

Columbium and tantalum ordinarily occur in nature as isomorphous mixtures of the pentoxides of the metals and it is extremely exceptional to find one without a considerable proportion of the other. When the tantalum pentoxide content is higher than the columbium pentoxide, the ore is called tantalite; similarly when the columbium pentoxide content is higher, the ore is called columbite.

Both columbium and tantalum have a fairly wide commercial usage and are becoming increasingly important in the field of stainless and heat resisting alloys. The invariable occurrence of these two metals together, the similarity of their compounds, and the difficulty experienced in separating them from each other and from associated metals have been retarding factors to their more general usage.

It is an object of this invention to provide a method of treating columbite, tantalite, and similar ores to separate and recover compounds of columbium and tantalum, each being substantially free from the other.

Another object is to prepare mixed oxides of columbium and tantalum with substantial freedom from other associated metal in the ore.

A further object is to prepare and separate columbium and tantalum compounds from mixed oxides of columbium and tantalum.

According to the invention, columbium-tantalum bearing ore is treated by a method comprising digesting roasted, comminuted ore with sulfuric acid and a sulfate salt; leaching the resulting mass with water to remove acid and soluble salts; adding the residue containing columbium and tantalum to a solution of oxalic acid and an alkali metal oxalate; adjusting the pH to 2.0 to 3.0 by adding an acid, e. g. hydrochloric; adding a hydrolyzing agent (a weak base that will not produce an insoluble precipitate of columbium at pH less than 5.0) and precipitating the tantalum by permitting the solution to stand until the pH rises to 4.5 to 5.0; filtering out the precipitated tantalum; precipitating columbium from the filtrate by a suitable reagent, e. g. ammonium hydroxide.

In the preferred form of the invention columbium-tantalum ore, for example, columbite or tantalite, or other ore of similar character, is given an oxidizing roast at 600–800° C. to render it more readily digestable in subsequent acid treatment. The ore is preferably comminuted to a fineness to pass through a 200 mesh screen (0.0029 in. openings) and digested for about 5 to 10 hours with acid to convert the iron and manganese to soluble salts. The digestion is preferably done at a somewhat elevated temperature in the range of 200 to 400° C. with sulfuric acid and a sulfate salt such as, for example, ammonium or sodium sulfate. The digested, pasty mass is then leached with water, filtered and washed to eliminate the sulfuric acid and soluble salts, leaving the columbium and tantalum in the residue as hydrated oxides.

The residue containing the columbium and tantalum is added to a solution of oxalic acid and potassium oxalate. The quantity of oxalic acid-oxalate solution should preferably be in slight excess over that required stoichiometrically to form the oxalates of columbium and tantalum. The strength of the solution, i. e. the volume, appears to be of no significance. The presence of an alkali metal ion, preferably potassium, is essential in the subsequent hydrolysis. This indicates the formation of a soluble, duplex, potassium-columbium salt; whereas tantalum does not form a similar compound under these conditions. Sodium may be substituted for potassium in the oxalic acid solution but the resulting duplex sodium-columbium salt is much less soluble than the corresponding potassium-columbium salt, thereby lowering the efficiency of the subsequent separation. The pH of the resulting oxalic acid-oxalate solution is adjusted to between 2.0 and 3.0 by the slow addition of an acid, for example, hydrochloric acid.

A weak base that will not produce an insoluble precipitate of columbium at pH less than 5.0, herein called a hydrolyzing agent, is then added. Weak bases suitable for this purpose comprise:

(a) Ammonium hydroxide.
(b) Ammonum salts of weak acids, e. g. ammonium carbonate.
(c) Amines that yield ammonia upon hydrolysis, e. g. urea.
(d) Alkali salts of weak acids, e. g. potassium bicarbonate.

Subsequent to this addition the reacting materials are permitted to stand under conditions favorable for hydrolysis, preferably at a slightly elevated temperature. With urea it was found that standing at a temperature of 80 to 100° C. gave satisfactory results. During hydrolysis the pH value rises. At a pH value of 4.5 to 5.0 the tantalum is substantially completely precipitated, relatively free from columbium. The pH value should not be allowed to exceed 5.0 as columbium may be precipitated at pH values higher than 5.0. Obtaining a pH value of 4.5 to 5.0, rather than a specific time or temperature, is the criterion for determining the desired end point of the reaction. At a pH value of 4.5 to 5.0 the tantalum precipitate is filtered out of the solution containing the soluble columbium salt. The columbium may be recovered from the filtrate by well known procedures, for example, precipitation with ammonium hydroxide. For economic reasons, it may be desirable to recover the oxalic acid from the filtrate. This may be done by conventional processes such as precipitation with calcium salts and regeneration with sulfuric acid.

The mechanism of the reaction hereinbefore referred to as "hydrolysis" apparently comprises the preferential conversion of tantalum oxalate to hydrated tantalum oxide and flocculation of the latter. Such employment of the word "hydrolysis," or other explanation of the reaction mechanism in this specification is not to be construed as effecting any limitation on the scope of the invention but is given only to aid in a general understanding of the probable operation of the invention.

As a specific example, the application of the invention to the separation of columbium and tantalum from columbite ore will be given. A comminuted ore containing 54.2% $Cb_2O_5$ and 19.9% $Ta_2O_5$ together with usual ore impurities including iron and manganese was roasted for 2 to 3 hours until the ore changed in color from black to brown. A charge of 50 parts by weight of the roasted ore was digested for about 8 hours at between 200 and 400° C. with 184 parts of concentrated sulfuric acid and 25 parts of ammonium sulfate; 500 parts of water were added to the pasty mass which was stirred to effect suspension of the solids. The suspension was added to 4000 parts of water, heated at about 90° C., with continuous stirring, for one hour, filtered and washed to remove sulfuric acid and soluble salts, including the salts of iron and manganese. The wet cake was taken up in a solution of 125 parts of oxalic acid and 75 parts of potassium hydroxide in 2500 parts of water. The pH was adjusted to 2.2 by the addition of approximately 6 parts of hydrochloric acid (about 36%) and the solution allowed to stand for about 15 hours. To this solution, 25 parts of urea were added and the solution heated at about 90° C. until the pH reached 4.8. The precipitate was then removed by filtration and ignited to $Ta_2O_5$. The filtrate was boiled to decompose urea after which 40 parts of ammonium hydroxide were added to precipitate columbium. The columbium precipitate was filtered out of the solution, washed and ignited to $Cb_2O_5$.

About 71% of the columbium in the ore was recovered as high purity product containing 93.17% $Cb_2O_5$ and only 1.3% $Ta_2O_5$. The tantalum precipitate obtained from the hydrolysis step contains some columbium, and much higher yields of columbium may be obtained by recycling the tantalum from this step. In an operation in which this was done the recovery of high purity $Cb_2O_5$ was 95%.

Although a specific example has been given in the foregoing specification, this example is given merely to illustrate the principles of the invention and a mode of operation. The invention is not to be limited to or by such example.

What is claimed is:

1. A method of treating ore containing columbium and tantalum values comprising digesting the ore with concentrated sulfuric acid and a sulfate salt; adding water to the products of the digestion; separating the water soluble and water insoluble products of the digestion; treating the water insoluble products containing columbium and tantalum values with oxalic acid solution containing an alkali metal ion to effect solution of the water insoluble products; adjusting the pH of the solution thus obtained to between 2 and 3 by the addition of an acid; adding a weak base that will not produce an insoluble precipitate of columbium at pH less than 5.0; permitting the pH to rise to between 4.5 and 5.0 to precipitate tantalum values and separating the precipitated tantalum values from the solution.

2. A method comprising adding oxalic acid solution containing an alkali metal ion to a mixture of the oxides of columbium and tantalum to effect solution of such mixture; adjusting the pH of such solution to between 2 and 3 by the addition of an acid; adding a weak base that will not produce an insoluble precipitate of columbium at pH less than 5.0 to such solution and permitting the pH to rise to between 4.5 and 5.0 to precipitate tantalum values and separating the precipitated tantalum values from the solution.

3. A method of treating ore containing columbium and tantalum values comprising digesting roasted comminuted ore with concentrated sulfuric acid and a sulfate salt for 5 to 10 hours at a temperature between 200° C. and 400° C.; adding water to the products of digestion; filtering out the insoluble residue containing the columbium and tantalum values; treating the residue with oxalic acid solution containing a potassium ion to effect solution of the columbium and tantalum values; adjusting the pH of the solution to between 2 and 3 by the addition of hydrochloric acid; adding a weak base that will not produce an insoluble precipitate of columbium at pH less than 5.0; heating the solution at about 80 to 100° C. until the pH reaches 4.5 to 5.0 to precipitate tantalum values and separating the precipitated tantalum values from the solution.

ROBERT M. FOWLER.

REFERENCES CITED

The following references are of record in the file of this patent:

UNITED STATES PATENTS

| Number | Name | Date |
|---|---|---|
| 2,259,396 | Sechlecht et al. | Oct. 14, 1941 |

OTHER REFERENCES

Powell et al., "The Analyst," vol. 50 (1925), pp. 485–498.

Rohmer, "Chemical Abstracts," vol. 36 (1942) p. 364.

Certificate of Correction

September 13, 1949

Patent No. 2,481,584

ROBERT M. FOWLER

It is hereby certified that error appears in the printed specification of the above numbered patent requiring correction as follows:

Column 3, line 54, for the numeral "48" read *4.8*;

and that the said Letters Patent should be read with this correction therein that the same may conform to the record of the case in the Patent Office.

Signed and sealed this 17th day of January, A. D. 1950.

[SEAL]

THOMAS F. MURPHY,
*Assistant Commissioner of Patents.*